(12) United States Patent
Kim et al.

(10) Patent No.: US 12,298,724 B2
(45) Date of Patent: May 13, 2025

(54) DEVICE AND METHOD FOR ASSISTING IN ASSIGNING COMPRESSOR CONTROLLER SETTINGS VALUES, AND COMPRESSOR OPERATION CONTROL SYSTEM

(71) Applicant: Hitachi Industrial Equipment Systems Co., Ltd., Tokyo (JP)

(72) Inventors: Eunkyeong Kim, Tokyo (JP); Tatsurou Yashiki, Tokyo (JP); Nobuhiro Tottori, Tokyo (JP)

(73) Assignee: HITACHI INDUSTRIAL EQUIPMENT SYSTEMS CO., LTD., Tokyo (JP)

( * ) Notice: Subject to any disclaimer, the term of this patent is extended or adjusted under 35 U.S.C. 154(b) by 347 days.

(21) Appl. No.: 17/786,622

(22) PCT Filed: Dec. 18, 2020

(86) PCT No.: PCT/JP2020/047565
§ 371 (c)(1),
(2) Date: Jun. 17, 2022

(87) PCT Pub. No.: WO2021/140885
PCT Pub. Date: Jul. 15, 2021

(65) Prior Publication Data
US 2023/0034599 A1    Feb. 2, 2023

(30) Foreign Application Priority Data
Jan. 6, 2020    (JP) .................. 2020-000423

(51) Int. Cl.
G05B 19/04    (2006.01)
G05B 19/042    (2006.01)

(52) U.S. Cl.
CPC .... *G05B 19/042* (2013.01); *G05B 2219/2614* (2013.01)

(58) Field of Classification Search
CPC .......... G05B 19/042; G05B 2219/2614; F04B 49/02; F04B 49/06; Y02P 80/10
See application file for complete search history.

(56) References Cited

U.S. PATENT DOCUMENTS

2011/0129361 A1*    6/2011    Sato .................. F04C 28/28
                                                 417/213
2012/0029706 A1    2/2012    Wagner et al.
(Continued)

FOREIGN PATENT DOCUMENTS

JP    11-287188 A    10/1999
JP    2012-513563 A    6/2012
(Continued)

OTHER PUBLICATIONS

International Search Report of PCT/JP2020/047565 dated Feb. 22, 2021.
Written Opinion of PCT/JP2020/047565 dated Feb. 22, 2021.

*Primary Examiner* — Christopher W Carter
(74) *Attorney, Agent, or Firm* — MATTINGLY & MALUR, PC

(57) ABSTRACT

A device for assisting in assigning setting values of a compressor operation controller for starting or stopping one or more compressors, collecting discharged air of the compressors in an air tank, and supplying the air tank as a compressed air source in a predetermined pressure range, includes: an input unit that receives piping network information which is an element of a pressure loss of a piping flow from the compressor to a pressure control position of the controller, compressor specifications which are an upper limit of a discharge pressure of the compressor and a number of compressor starts/stops, a supply flow rate condition which is time change data of a flow rate flowing from the pressure control position of the controller, and a supply
(Continued)

pressure condition which is a lower limit of the supply pressure at the pressure control position of the controller.

12 Claims, 7 Drawing Sheets

(56) References Cited

U.S. PATENT DOCUMENTS

| | | | |
|---|---|---|---|
| 2012/0059635 A1* | 3/2012 | Ebisawa | F04D 27/001 |
| | | | 703/2 |
| 2016/0252091 A1* | 9/2016 | Wagner | F04B 49/065 |
| | | | 702/35 |
| 2018/0039719 A1 | 2/2018 | Liu et al. | |
| 2018/0372086 A1* | 12/2018 | Yashiki | F04B 49/10 |
| 2019/0056702 A1* | 2/2019 | Angel | G05B 13/0265 |
| 2019/0187640 A1 | 6/2019 | Fowler | |
| 2020/0278704 A1 | 9/2020 | Liu et al. | |

FOREIGN PATENT DOCUMENTS

| | | |
|---|---|---|
| JP | 2016-162343 A | 9/2016 |
| WO | 2012/127783 A1 | 9/2012 |
| WO | 2017/119306 A1 | 7/2017 |
| WO | 2018/092866 A1 | 5/2018 |

\* cited by examiner

F I G. 1
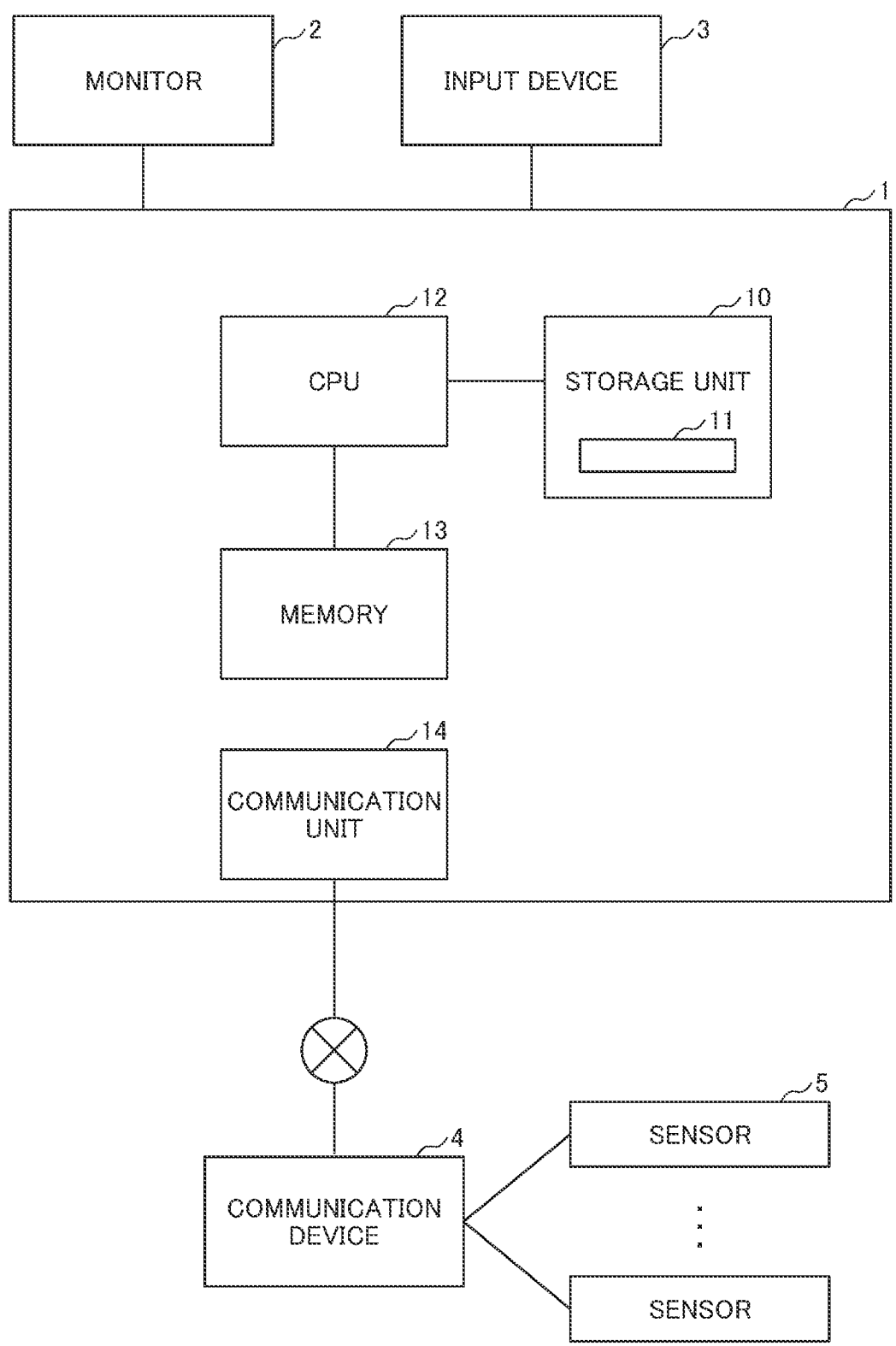

FIG. 4

| n | PRESSURE TARGET VALUE | PRESSURE L | PRESSURE H |
|---|---|---|---|
| 1 | 0.61 | 0.01 | 0.01 |
| 2 | 0.62 | 0.01 | 0.01 |
| 3 | 0.63 | 0.01 | 0.01 |
| 4 | 0.64 | 0.01 | 0.01 |
| 5 | 0.65 | 0.01 | 0.01 |
| 6 | 0.66 | 0.01 | 0.01 |
| 7 | 0.61 | 0.01 | 0.03 |
| ... | ... | ... | ... |
| 12 | 0.66 | 0.01 | 0.03 |
| 13 | 0.61 | 0.01 | 0.05 |
| ... | ... | ... | ... |
| 18 | 0.66 | 0.01 | 0.05 |
| 19 | 0.61 | 0.03 | 0.01 |
| ... | ... | ... | ... |
| 24 | 0.66 | 0.03 | 0.01 |
| 25 | 0.61 | 0.03 | 0.03 |
| ... | ... | ... | ... |
| 30 | 0.66 | 0.03 | 0.03 |
| 31 | 0.61 | 0.03 | 0.05 |
| ... | ... | ... | ... |
| 36 | 0.66 | 0.03 | 0.05 |
| 37 | 0.61 | 0.05 | 0.01 |
| ... | ... | ... | ... |
| 42 | 0.66 | 0.05 | 0.01 |
| 43 | 0.61 | 0.05 | 0.03 |
| ... | ... | ... | ... |
| 48 | 0.66 | 0.05 | 0.03 |
| 49 | 0.61 | 0.05 | 0.05 |
| ... | ... | ... | ... |
| 54 | 0.66 | 0.05 | 0.05 |

FIG. 7

| n | SETTING VALUE COMBINATION ||| PREDICTED VALUE ||
| | PRESSURE TARGET VALUE | PRESSURE L | PRESSURE H | MINIMUM SUPPLY PRESSURE VALUE | NUMBER OF COMPRESSOR STARTS/STOPS |
|---|---|---|---|---|---|
| 1 | 0.61 | 0.01 | 0.01 | 0.490 | 30 |
| 2 | 0.62 | 0.01 | 0.01 | 0.500 | 17 |
| 3 | 0.63 | 0.01 | 0.01 | 0.510 | 15 |
| 4 | 0.64 | 0.01 | 0.01 | 0.520 | 13 |
| 5 | 0.65 | 0.01 | 0.01 | 0.530 | 10 |
| 6 | 0.66 | 0.01 | 0.01 | 0.540 | 8 |
| 7 | 0.61 | 0.01 | 0.03 | 0.490 | 20 |
| ... | ... | ... | ... | ... | ... |
| 12 | 0.66 | 0.01 | 0.03 | 0.540 | 16 |
| 13 | 0.61 | 0.01 | 0.05 | 0.490 | 12 |
| ... | ... | ... | ... | ... | ... |
| 18 | 0.66 | 0.01 | 0.05 | 0.540 | 12 |
| 19 | 0.61 | 0.03 | 0.01 | 0.490 | 17 |
| ... | ... | ... | ... | ... | ... |
| 24 | 0.66 | 0.03 | 0.01 | 0.520 | 20 |
| 25 | 0.61 | 0.03 | 0.03 | 0.480 | 15 |
| ... | ... | ... | ... | ... | ... |
| 30 | 0.66 | 0.03 | 0.03 | 0.520 | 15 |
| 31 | 0.61 | 0.03 | 0.05 | 0.480 | 13 |
| ... | ... | ... | ... | ... | ... |
| 36 | 0.66 | 0.03 | 0.05 | 0.520 | 9 |
| 37 | 0.61 | 0.05 | 0.01 | 0.470 | 13 |
| ... | ... | ... | ... | ... | ... |
| 42 | 0.66 | 0.05 | 0.01 | 0.510 | 14 |
| 43 | 0.61 | 0.05 | 0.03 | 0.470 | 8 |
| ... | ... | ... | ... | ... | ... |
| 48 | 0.66 | 0.05 | 0.03 | 0.510 | 8 |
| 49 | 0.61 | 0.05 | 0.05 | 0.470 | 6 |
| ... | ... | ... | ... | ... | ... |
| 54 | 0.66 | 0.05 | 0.05 | 0.510 | 6 |

DEVICE AND METHOD FOR ASSISTING IN ASSIGNING COMPRESSOR CONTROLLER SETTINGS VALUES, AND COMPRESSOR OPERATION CONTROL SYSTEM

TECHNICAL FIELD

The present invention relates to a technique for assisting in assigning a setting value of a controller that controls a compressor such as an air compressor.

BACKGROUND ART

Many factories and plants have manufacturing equipment that consumes and drives air (hereinafter referred to as air consumption equipment), and are equipped with equipment that supplies air to the air consumption equipment.

Compressed air supply equipment includes components such as air compressors (hereinafter referred to as compressors), tanks, filters, and valves, and pipes that connect those components and the air consumption equipment to send compressed air to the air consumption equipment. The air supply equipment changes a load of the compressor to control the amount of air supplied to the air consumption equipment and a supply pressure.

There are two types of compressors, one that continuously changes the load and the other that switches between a 100% load (load) and a 0% load (unload). With a compressor that switches the load to a loaded or unloaded state (hereinafter referred to as load/unload), if a large number of switching operation is performed in a short period of time, a compressor body may become hot and cause a failure. On the other hand, if the loading/unloading of the compressor is delayed, the supply pressure may fall below a lower limit or exceed an upper limit.

As a method of controlling the supply pressure using the compressor that switches to the loaded/unloaded state, the method is to set a target value, a lower limit, and an upper limit of supply pressure, values related to a time (hereinafter referred to as timer) for avoiding sudden changes in the supply pressure due to the loaded/unloaded state of the compressor, etc. in a controller in advance. And, the method is to start, load, unload, or stop the compressor in multiple cases based on those setting values.

Further, in order to provide the supply pressure more stably, a control method disclosed in Patent Literature 1 has been devised. In the control method of Patent Literature 1, a pressure change rate of a supply pressure at the current time is calculated, and the pressure after ΔT seconds is estimated assuming that the pressure changes with the pressure change rate. If it is predicted that the pressure estimation value exceeds the lower limit or the upper limit, the compressor starts or stops.

CITATION LIST

Patent Literature

PTL 1: Japanese Unexamined Patent Application Publication No. Hei 11-287188
PTL 2: Japanese Unexamined Patent Application Publication (Translation of PCT Application) No. 2012-513563
PTL 3: PCT International Publication No. 2017/119306
PTL 4: Japanese Unexamined Patent Application Publication No. 2016-162343

SUMMARY OF INVENTION

Technical Problem

In the control method described above, a problem is to determine an appropriate combination of controller setting values. The combination of the controller setting values is a combination of a target value, a lower limit, an upper limit, and multiple timers of the supply pressure. In the case of the control method of PTL 1, a time interval ΔT for estimating the pressure and a unit time Δt for calculating a pressure change rate are included as a combination of the controller setting values. If ΔT is small, the compressor starts or stops frequently (hereinafter referred to as start/stop), leading to a decrease in energy saving and a heat-up of the compressor. On the other hand, if ΔT is large, operations such as starting, loading, unloading, and stopping the compressor may be delayed, and the supply pressure may exceed the lower limit or upper limit (hereinafter referred to as lower limit/upper limit). In this way, ΔT is a setting value that is difficult to select.

In the past, when installing equipment, a skilled engineer of a controller manufacturer determined the combination of the setting values of the controller by know-how. For that reason, it was difficult for a person other than a skilled engineer, for example, an inexperienced engineer or a factory operator to determine the setting value combination of the controller, and even if there was a change in air consumption due to a change in a factory production plan, a change in a required supply pressure, or a replacement of an air supply equipment, it was difficult to change the setting value of the controller.

As a method that does not require input of a large number of setting values, there is a control method disclosed in PTL 2. A technique disclosed in PTL 2 makes it possible to eliminate a need to input a large number of controller setting values by capturing a temporal change of the pressure in the switching to the loaded/unloaded state by simulation. However, in the technique of PTL 2, it is necessary to include a computer that executes a large number of arithmetic processes in the controller for simulation.

The present invention takes the above circumstances into consideration, and provides a device for assisting in assigning compressor controller setting values, which can input an acquired appropriate combination of controller setting values to the controller, and aiming for stable supply of compressed air, improvement of energy saving, and avoidance of heat-up by starting and stopping the compressor.

Solution to Problem

An example of the "device for assisting in assigning compressor controller settings values" to solve the above problems will be described below.

A device for assisting in assigning setting values of a compressor operation controller for starting or stopping one or more compressors, collecting discharged air of the compressors in an air tank, and supplying the air tank as a compressed air source in a predetermined pressure range, includes an input unit that receives piping network information which is an element of a pressure loss of a piping flow from the compressor to a pressure control position of the controller, compressor specifications which are an upper limit of a discharge pressure of the compressor and a number of compressor starts/stops, a supply flow rate condition which is time change data of a flow rate flowing from the pressure control position of the controller, and a supply pressure condition which is a lower limit of the supply pressure at the pressure control position of the controller; a controller setting value generation unit that generates a combination of the controller setting values and gives the generated combination to a simulator; the simulator that calculates time-series data of the supply pressure and time series data of an operating state of the compressor by combining a piping network model that simulates the pressure and flow rate of the piping network and a controller model that simulates a signal of the controller; an output item calculation unit that calculates a predicted value of the supply pressure and a number of compressor starts/stops according to calculation results output by the simulator; and an output unit that outputs a combination of a plurality of the controller setting values, a predicted value of the supply pressure and the number of compressor starts/stops for the combination of the controller setting values.

Advantageous Effects of Invention

According to the present invention, an appropriate combination of the controller setting values can be obtained and input to the controller, which makes it possible to perform stably supply of a compressed air, an improvement in energy saving, and avoidance of heat-up by starting and stopping the compressor.

Problems, configurations and effects other than those mentioned above will be clarified by the description of the following embodiments.

BRIEF DESCRIPTION OF DRAWINGS

FIG. 1 is a schematic configuration diagram of a device for assisting in assigning compressor controller settings values according to Example 1 of the present invention.

FIG. 4 is a diagram showing an example of a table of combinations of the controller setting values of Example 1.

FIG. 7 is a diagram showing an example of a table displayed on a monitor screen according to Example 1.

DESCRIPTION OF EMBODIMENTS

Figure 2:
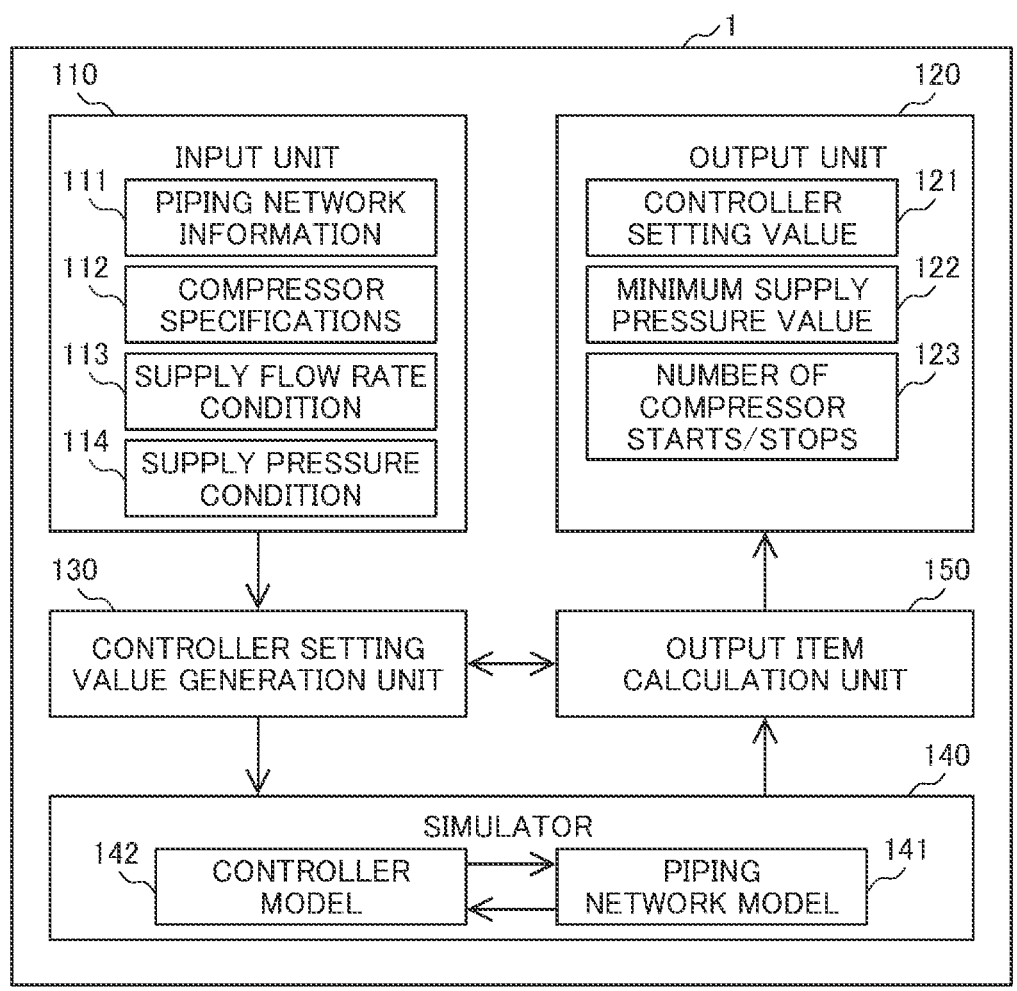
FIG. 2 is a functional block configuration diagram of the device for assisting in assigning compressor controller settings values according to Example 1 of the present invention.

Hereinafter, embodiments of the present invention will be described in detail with reference to the drawings.

Example 1

In a compressed air supply equipment, a discharged air of one or more compressors is collected in an air tank (tank), the compressor is started or stopped by an operation controller, and the air is supplied as a compressed air source in a predetermined pressure range. In order for the compressed air supply equipment to operate properly, it is necessary to set an appropriate combination of setting values in the operation controller and start or stop the compressor based on those setting values.

FIG. 1 is a schematic configuration diagram of a device for assisting in assigning settings values for an air compressor (hereinafter referred to as a compressor) controller according to Example 1 of the present invention. A device 1 for assisting in assigning controller settings values in Example 1 is configured by a computer such as a personal computer, and connected to a monitor 2 as a display unit, and an input device 3 such as a keyboard or a mouse for receiving user input. In addition, the device 1 for assisting in assigning settings values includes a storage unit 10 such as a hard disk for storing programs and data, a CPU 12 for performing arithmetic processing, and a memory 13 such as RAM for temporarily storing data during arithmetic processing. In addition, the device 1 for assisting in assigning settings values includes a communication unit 14 that exchanges data with an external network, is connected to a communication device 4 that receives signals from sensors 5 installed in an air supply facility, and can receive data such as pressure through a communication network. Further, the storage unit 10 stores a program 11 for calculating a combination of controller setting values.

In FIG. 1, the monitor 2 and the input device 3 are shown separately from the device 1 for assisting in assigning settings values, but the device 1 for assisting in assigning settings values may be configured by a tablet or the like. In that case, the device 1 for assisting in assigning settings values is integrated with the monitor 2 and the input device 3. Further, the device 1 for assisting in assigning settings values may be configured on a center or cloud so that data can be input or the result can be output from a terminal such as a tablet through a communication line such as the internet.

FIG. 2 shows a functional block configuration diagram of the device 1 for assisting in assigning compressor controller settings values. The device 1 for assisting in assigning settings values functionally includes an input unit 110, an output unit 120, a controller setting value generation unit 130, a simulator 140, and an output item calculation unit 150.

The device 1 for assisting in assigning settings values shown in FIG. 2 can be realized by the CPU 12 loading a predetermined program 11 on the memory and the CPU 12 executing the predetermined program 11 loaded on the memory in the computer. The predetermined program may be input from the storage unit 10 such as a hard disk in which the program is stored, or from the network through the communication unit 14, and loaded onto the memory.

The input unit 110 receives piping network information 111, compressor specifications 112, a supply flow rate condition 113, and a supply pressure condition 114 input by the user through the input device 3, and outputs those input items to the controller setting value generation unit 130. For piping network information, etc., information stored in a database of the center may be input through the communication line.

The output unit 120 receives a controller setting value 121, a minimum supply pressure value 122, and a number of compressor starts/stops 123 from the output item calculation unit 150, outputs those values to the monitor 2, and displays the values on the screen.

The controller setting value generation unit 130 generates a combination of the controller setting values, and gives the combination of the controller setting values and the input items received from the input unit 110 to the simulator 140.

The simulator 140 has a piping network model 141 and a controller model 142, and simulates the behavior of an air supply facility while exchanging signals between both models.

The piping network model 141 is constructed based on the piping network information 111 received from the controller setting value generation unit 130 and the discharge pressure of the compressor specifications 112, and physical quantities such as a pressure and a flow rate in the piping network are calculated based on physical formulas such as the law of conservation of a mass, a momentum, and an energy, and calculation conditions. The model construction method and the calculation method may be any known method, and are disclosed in, for example, PTL 3. The calculation conditions for the piping network model 141 are the supply flow rate condition 113 received from the controller setting value generation unit 130 and the discharge pressure of the compressor. In this example, the discharge pressure of the compressor is calculated based on the control signal to the compressor received from the controller model 142 and the discharge pressure of the compressor specifications 112. In addition, the piping network model 141 gives the pressure (hereinafter referred to as supply pressure) at a position controlled by the controller on the piping network as the supply pressure (hereinafter referred to as pressure control position) to the controller model 142.

The controller model 142 simulates a signal processing flow of the controller. The controller model 142 receives the controller setting value from the controller setting value generation unit 130, and receives the supply pressure from the piping network model 141. With the use of the above values, the controller model 142 performs the same signal processing as that of the controller, calculates a control signal to the compressor, and outputs the control signal to the element model that simulates the compressor in the piping network model 141.

The simulator 140 combines both models in this way, calculates time-series data of the supply pressure and time-series data of the operating state of the compressor, and gives those pieces of data to the output item calculation unit 150.

The output item calculation unit 150 receives the time-series data of the supply pressure from the simulator 140 and the time-series data of the operating state such as start, load, unload, and stop of the compressor, and calculates the minimum supply pressure value 122 and the number of compressor starts/stops 123.

Next, the details of the input unit 110, the controller setting value generation unit 130, the processing flow, and the output unit 120 will be described.

<Input Unit>

First, the details of the input unit 110 will be described.

The piping network information 111 is information on the elements necessary for calculating a pressure loss of the air piping flow from the compressor to the pressure control position. Specifically, the piping network information 111 is the specifications of pipes such as a length and diameter of pipes and a roughness of surface inside pipes, and the specifications of component equipment such as elbows, dryers, filters, and tanks. The pressure control position is often in the air tank (tank). The method for inputting the piping network information 111 may be any known method, for example, the method disclosed in PTL 4.

Specifically, the compressor specification 112 is the number of times that start and stop are repeated per allowable unit time to avoid damage to a discharge pressure, a discharge air amount, heat up of a compressor body, and the like (hereinafter referred to as the allowable number of starts/stops).

Specifically, the supply flow rate condition 113 is time change data of the flow rate (hereinafter referred to as the supply flow rate) at a pressure control position. A measured value is desirable for the supply flow rate condition 113, but if the equipment is new and the measured value does not exist, a planned value may be used.

The supply pressure condition 114 is specifically a lower limit of the supply pressure. The lower limit of the supply pressure is often determined according to the specifications of the air consuming equipment.

The input item of the input unit 110 may receive data from the external communication device 4 through the communication unit 14.

<Controller Setting Value Generation Unit>

Next, the details of the controller setting value generation unit 130 will be described.

As a method of generating a combination of controller setting values, in Example 1, a method of generating a combination pattern according to a predetermined rule will be described.

The controller setting values include a pressure target value, multiple pressure lower limits, multiple pressure upper limits, and timers related to the load/unload and start/stop operations of the compressor in each case divided by the lower limits and the upper limits. In the case of the control method in PTL 1, the combination of the controller setting values includes a time interval $\Delta T$ for estimating the pressure and a unit time $\Delta t$ for calculating the pressure change rate.

A relationship between the controller setting value and the control signal will be briefly described. When the supply pressure falls below the pressure lower limits, the compressor is loaded after a certain period of time (Ta) has elapsed. When the supply pressure exceeds the upper limit of the pressure, the compressor is unloaded after a certain period of time (Tb) has elapsed. In this example, the certain period of times Ta and Tb are the timers described above, and are setting values that affect the stability of control. Hereinafter, the supply pressure may be a measured value from a sensor, or may be a predicted value by some processing, for example, simulation.

As described above, there are many controller setting values, but in Example 1, three setting values of a pressure target value, a pressure lower limit width (=pressure target value−pressure lower limit. Hereinafter referred to as a pressure L), and a pressure upper limit width (=pressure upper limit−pressure target value. Hereinafter referred to as a pressure H) will be described. Even if the timer is included, the processing flow of the controller setting value generation unit 130 is the same. In addition, in a form of controlling the pressure using multiple compressors (unit control), the behavior of starting and stopping another compressor after a certain period of time (Tc, Td) may be included.

<Processing Flow>

Figure 3:
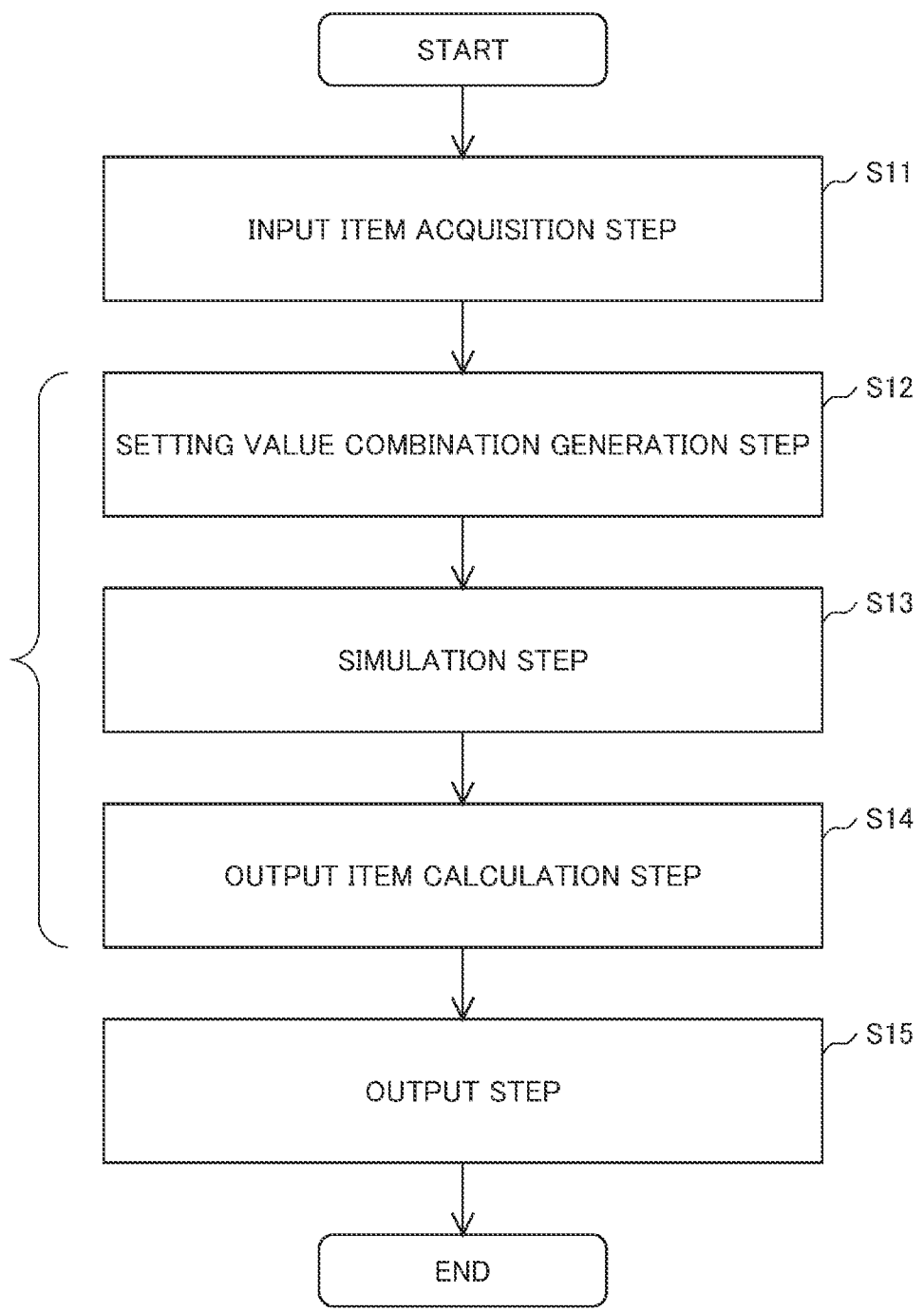
FIG. 3 is a diagram showing a processing flow of the device for assisting in assigning setting values according to Example 1.

Referring to FIG. 3, a processing flow of the device 1 for assisting in assigning compressor controller settings values will be described.

As an input item acquisition step S11, the input unit 110 acquires the input item.

Next, as a setting value combination generation step S12, a combination of the controller setting values is generated according to a predetermined rule. For example, as shown below, a pressure target value of six patterns, a pressure L of three patterns, and a pressure H of three patterns are generated, and as shown in FIG. 4, a combination C (n) of 54 patterns is generated. Hereinafter, n is an index assigned to the combination, and a range that n can take is 1 or more and 54 or less.

Pressure target value: 0.61, 0.62, 0.63, 0.64, 0.65, 0.66
Pressure H: 0.01, 0.03, 0.05
Pressure L: 0.01, 0.03, 0.05

Next, as a simulation step S13, the simulator 140 performs simulation based on the combination of the input item acquired in the input item acquisition process S11 and the controller setting value generated in the setting value combination generation process S12, to calculate the time-series data of the supply pressure and the time-series data of the operating state of the compressor.

Figure 5:
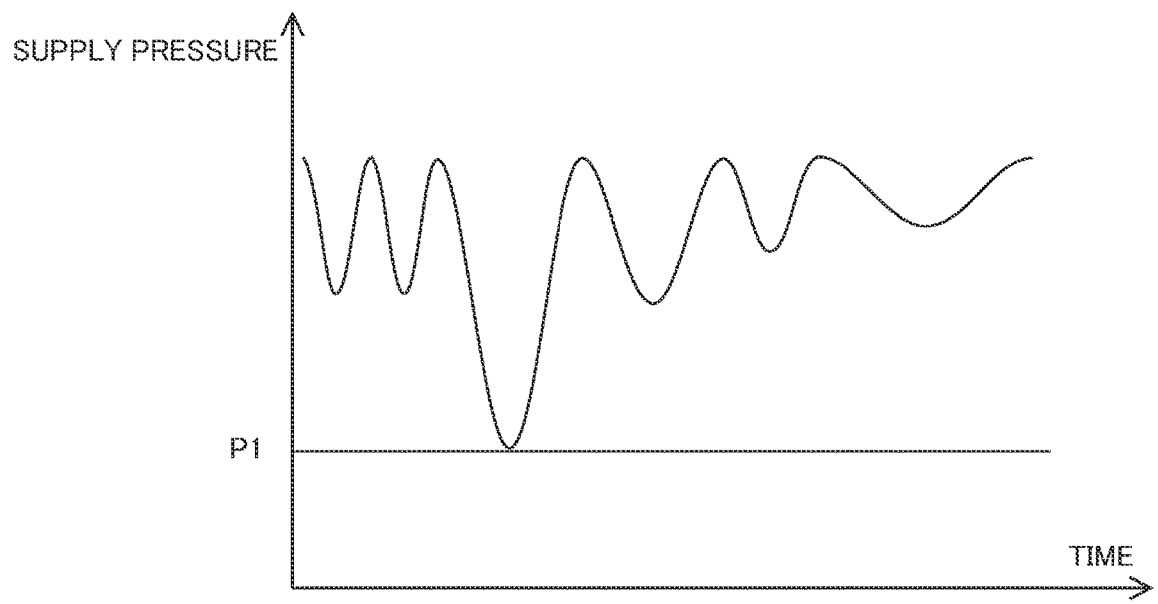
FIG. 5 is a diagram showing an example of time-series data of supply pressure from a simulator.
Figure 6:
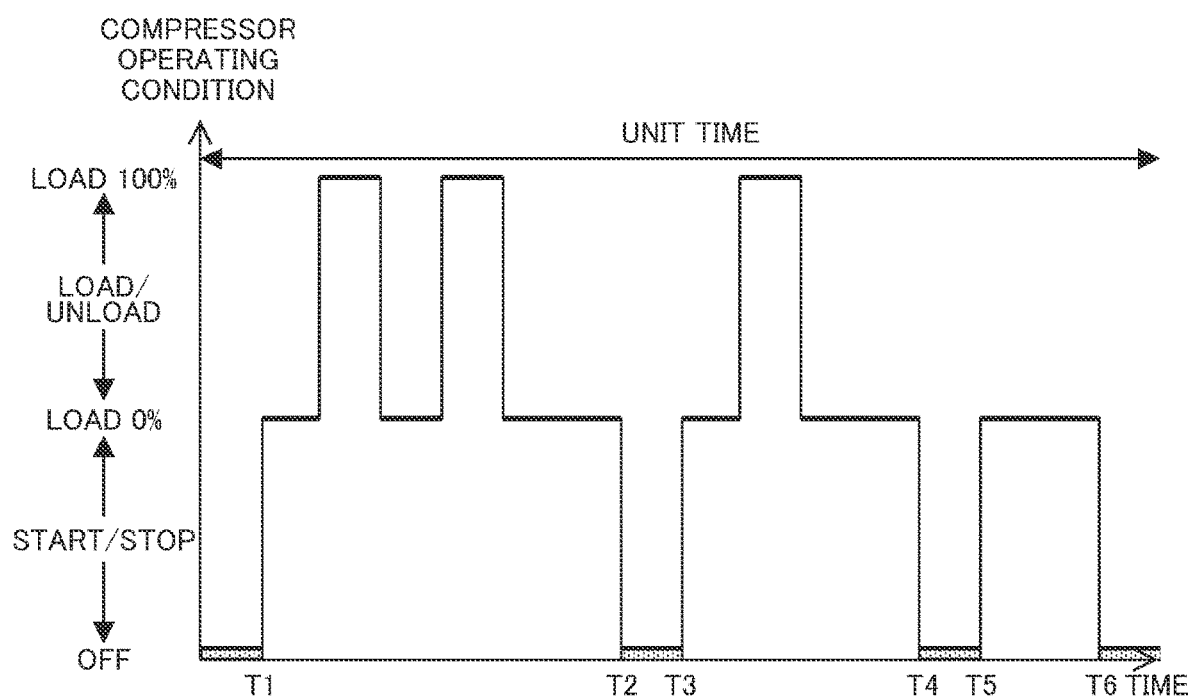
FIG. 6 is a diagram showing an example of time-series data of an operating state of the compressor from the simulator.

Next, as an output item calculation step S14, the output item calculation unit 150 calculates and outputs the output items given to the output unit 120. The output item calculation unit 150 calculates the minimum supply pressure value from the time-series data of the supply pressure received from the simulator 140. For example, in the case of the time-series data of the supply pressure shown in FIG. 5, a pressure P1 is the minimum value. In addition, the maximum value of the number of compressor starts/stops per unit time (hereinafter referred to as the number of compressor starts/stops) is obtained from the time-series data of the compressor start, load, unload, and stop operation states received from the simulator 140. For example, in the case of the time-series data of the compressor operating state shown in FIG. 6, the compressor is started or stopped at times T1 to T6, and the number of starts/stops is 6.

Next, as an output step S15, the output unit 120 outputs the controller setting value 121, the minimum supply pressure value 122 and the number of compressor starts/stops 123 for the controller setting value 121.

In this way, the controller setting value generation unit 130 gives the combination of the controller setting values generated in the setting value combination generation step S12 to the simulator 140 one by one in order, and the output item calculation unit 150 repetitively receives a predicted value for the combination. Finally, 54 data sets of the combination of the controller setting values, the minimum supply pressure value, and the number of compressor starts/stops are generated. The data set is output to the output unit 120.

In Example 1, as a method of generating the combination of the controller setting values, a method of generating the combination pattern according to a predetermined rule has been described. The rule used in the present invention is not limited to the above example, for example, a rule based on the supply pressure condition 114 received from the input unit 110, the discharge pressure of the compressor specifications 112, and a volume of the air flow calculated from the piping network information 111 may be used.

Further, in Example 1, a method of generating all combinations of the controller setting values in advance and outputting those combinations to the simulator 140 in order has been described. However, there is no need to be limited to the above configuration. A combination of the controller setting values to be output to the simulator 140 may be generated next according to the predicted value of the simulator 140 without generating all combinations of the controller setting values in advance. For example, if the minimum supply pressure value calculated based on the predicted value of the simulator 140 is lower than the lower limit of the pressure of the supply pressure condition 114, the pressure target value of the controller setting value to be output next is increased. In this case, if the predicted value of the simulator 140 satisfies the predetermined conditions, a process of generating the combination of the controller setting values is stopped. In this example, the following can be considered as the predetermined conditions.

The number of times the combination of the controller setting values is output to the simulator 140 exceeds a predetermined number of times.

The minimum supply pressure value predicted by the simulator 140 is larger than the lower limit of the supply pressure condition 114.

The number of compressor starts/stops predicted by the simulator 140 is smaller than the upper limit of the number of compressor starts/stops 123.

That is, optimization may be performed by performing the simulation by the simulator 140 based on the combination of one controller setting value generated by the controller setting value generation unit 130, returning the predicted value obtained by the output item calculation unit 150 to the controller setting value generation unit 130, and generating a next combination of the controller setting value.

<Output Unit>

Next, the details of the output unit 120 will be described.

The controller setting value 121 is a combination of the controller setting values generated in the setting value combination generation step S12 of the controller setting value generation unit 130.

The minimum supply pressure value 122 is the minimum supply pressure value calculated in the output item calculation step S14 of the output item calculation unit 150, and is a minimum value of the time-series data of the supply pressure calculated by the simulator 140 based on the controller setting value 121 and the input items.

The number of compressor starts/stops 123 is the number of compressor starts/stops calculated in the output item calculation step S14 of the output item calculation unit 150, and is a maximum value of the number of starts/stops per unit time, which has been obtained from the time-series data of the operating states of the start, load, unload, and stop of the compressor calculated by the simulator 140 based on the controller setting value 121 and the input items.

<Display Screen>

Next, the display screen displayed on the monitor 2 from the output unit 120 will be described.

On the display screen, data set of the controller setting value 121, the minimum supply pressure value 122, and the number of compressor starts/stops 123 described above is displayed. An example of the display form is shown in FIGS. 7 and 8.

FIG. 7 shows an example in which the pressure target value, the pressure L, and the pressure H, which are a combination of setting values, and the minimum supply pressure value, the number of compressor starts/stops, which are the predicted value, are displayed in a table. A user can select a combination of the supply pressure condition and the controller setting value that satisfies the allowable number of starts/stops of the compressor specifications.

Figure 8:
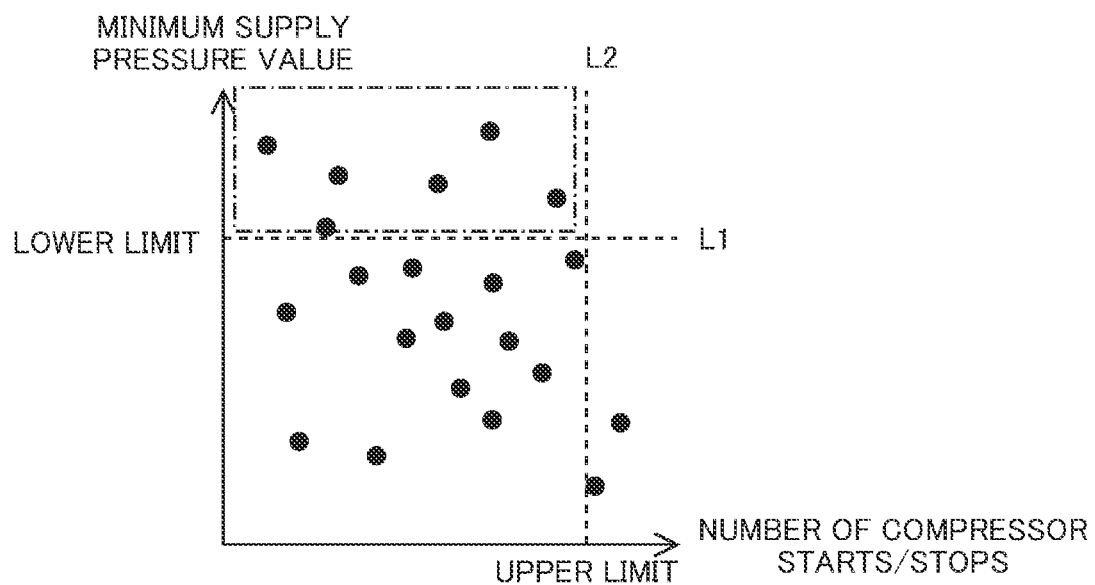
FIG. 8 is a diagram showing an example of a graph displayed on the monitor screen according to Example 1.

In addition, FIG. 8 is a graph with the minimum supply pressure value 122 on the vertical axis and the number of compressor starts/stops 123 on the horizontal axis. Each point of the graph shows the minimum supply pressure value 122 and the number of compressor starts/stops 123 for one combination of controller setting values. If the number of data sets is 54, the number of points becomes 54. A horizontal line L1 is the supply pressure condition 114 (supply pressure lower limit) input to the input unit 110, and the points above that line are a combination of the controller setting values that satisfy the supply pressure condition 114. A vertical line L2 is the allowable number of starts/stops of the compressor specifications 112 input to the input unit 110, and points to the left of that line is a combination of controller setting values that does not exceed the allowable number of starts/stops. In other words, points in an area within a frame indicated by an alternate long and short dash line is an appropriate combination of the controller setting values which satisfy required conditions.

In this example, in order to display the combination of the controller setting values at each point of the graph, for example, the following may be performed by using a known method.

Display an index of the combination of controller setting values near each point.

Provide a function to display the combination of controller setting values when each point is clicked.

A color of the points in an area within a frame indicated by an alternate long and short dash line may be changed and displayed.

Furthermore, one of the points in the area within the frame indicated by the alternate long and short dash line may be displayed in different colors with one point as the most desirable point. The most desirable condition is to be closest to the horizontal line L1 and farthest from the vertical line L2.

As described above, according to the present example, the user inputs the information of the air supply equipment (piping network information, compressor specifications) and the required air conditions (supply flow condition, supply pressure condition), and can acquire the appropriate combination of the controller setting values according to the input conditions. In this example, the user can be an engineer of a controller manufacturer, an operator of equipment, and the like. In the present example, an appropriate combination of controller setting values can be acquired even if the user has little experience and does not have know-how. The combination of the controller setting values obtained in the present example is input to the controller, so that stable air supply, an improvement of energy saving, and avoidance of heat-up due to many starts and stops of compressor can be achieved. In this way, the unstable supply pressure and a failure due to the compressor heat-up due to the input of inappropriate setting values to the compressor controller can be prevented in advance.

In addition, since it is easy to determine the combination of the controller setting values, if air usage conditions such as air consumption and supply pressure change due to changes in the production plan of the factory, the combination of the controller setting values can be easily changed according to this situation. For example, when the required pressure decreases due to changes in air usage conditions, the target pressure setting value of the supply pressure can be set to a low value, which further improves energy saving.

In the present example, three setting values of the pressure target value, the pressure lower limit width (=pressure target value−pressure lower limit), and the pressure upper limit width (=pressure upper limit−pressure target value) are targeted as the controller setting values. However, the target of the controller setting value according to the present invention is not limited to the above configuration. Multiple pressure lower limits, multiple pressure upper limits, and a timer related to the load/unload and start/stop operations in each case divided by the lower limit value and the upper limit value, which are used in the controller for controlling the pressure by the loading and unloading of the compressor, may be targeted.

The setting value related to pressure has a high influence on the output of the compressor in a settling state, and the lower the pressure target value, the better the energy saving performance. On the other hand, the timer has a high influence on the start/stop of the compressor and the operation timing of the load/unload when the pressure changes, and has a high influence on the responsiveness of the supply pressure and the stability of the control. However, the selection of the timer has been said to be particularly difficult. The method described in the present example can be used to determine an appropriate value for the timer. This provides the desired supply pressure responsiveness.

Further, the method described in the present example can determine appropriate values for the controller setting value of the pressure prediction control, the time interval $\Delta T$ for estimating the pressure, and the unit time $\Delta t$ for calculating the pressure change rate disclosed in PTL 1. You can determine the value.

Example 2

Figure 9:
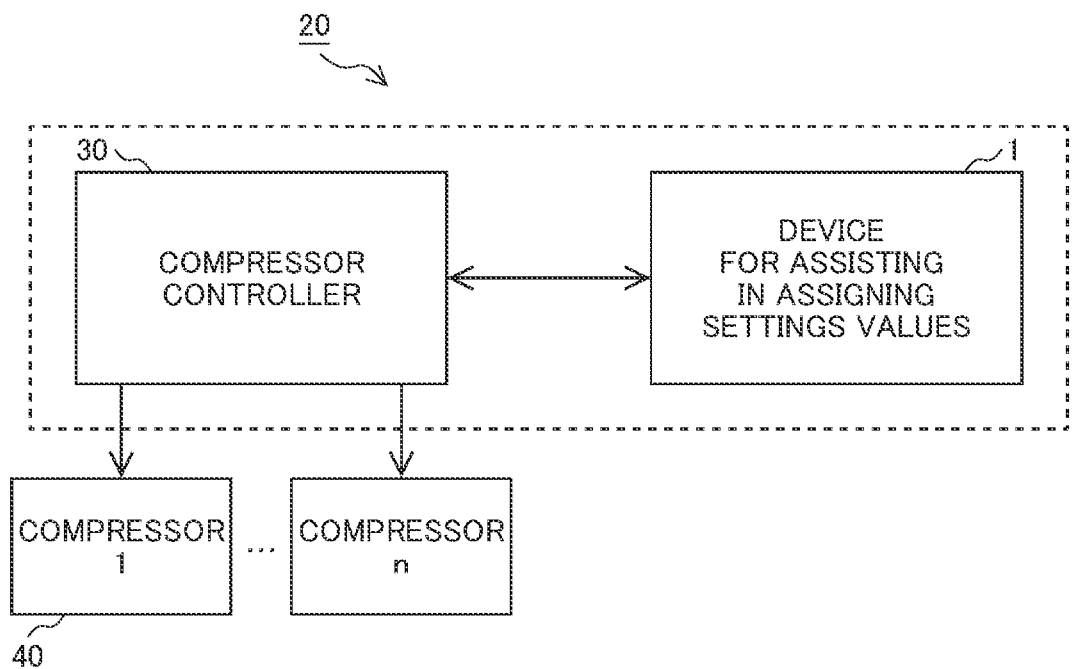
FIG. 9 is a diagram showing a schematic configuration of a compressor operation control system according to Example 2.

FIG. 9 shows a compressor operation control system according to Example 2 of the present invention.

A compressor operation control system 20 includes a compressor controller 30 that controls the operation of one or more compressors 40 and a device 1 for assisting in assigning compressor controller settings values described in Example 1. The compressor controller 30 and the device 1 for assisting in assigning settings values can communicate with each other or are configured integrally.

The device 1 for assisting in assigning settings values of the compressor controller 30 obtains an appropriate combination of controller setting values, and sets the controller setting value in the compressor controller 30. The controller setting value may be set by displaying the combination of the setting values as shown in FIGS. 7 and 8 on a monitor 2 and allowing an operator to select the setting value, or an optimum controller setting value may be set automatically by a machine.

According to the compressor operation control system of this example, the controller setting value obtained by the device 1 for assisting in assigning settings values can be easily set in the compressor controller 30.

REFERENCE SIGNS LIST

1: device for assisting in assigning settings values
2: monitor
3: input device
4: communication device
5: sensor
10: storage unit
11: program
12: CPU
13: memory
14: communication unit
20: compressor operation control system
30: compressor controller
40: compressor
110: input unit
111: piping network information
112: compressor specifications
113: supply flow rate condition
114: supply pressure condition
120: output unit
121: controller setting value
122: minimum supply pressure value 123: number of compressor starts/stops
130: controller setting value generation unit
140: simulator
150: output item calculation unit

The invention claimed is:

1. A compressor operation control system comprising:
a plurality of compressors;
a compressor operation controller, in communication with the plurality of compressors, for starting or stopping one or more of the compressors, collecting discharged air of the compressors in an air tank, and supplying the air tank as a compressed air source in a predetermined pressure range; and
a central processing unit (CPU) in communication with the compressor operation controller, the CPU programmed to:
receive piping network information which is an element of a pressure loss of a piping flow from the compressor to a pressure control position of the controller, compressor specifications which are an upper limit of a discharge pressure of the compressor and the number of start/stop times, a supply flow rate condition which is time change data of a flow rate flowing from the pressure control position of the controller, and a supply pressure condition which is a lower limit of the supply pressure at the pressure control position of the controller,
generate, based on a predetermined rule, a combination of the controller setting values and provide the generated combination to a simulator,
calculate, by the simulator, time-series data of the supply pressure and time series data of an operating state of the compressor by combining a piping network model that simulates the pressure and flow rate of the piping network and a controller model that simulates a signal of the controller,
calculate a predicted value of the supply pressure and a number of compressor starts/stops according to calculation results output by the simulator, and
output, to the compressor operation controller, a combination of a plurality of the controller setting values, a predicted value of the supply pressure for the combination of the controller setting values, and the number of compressor starts/stops,
wherein one or more of the compressors are controlled by the compressor operation controller to start or stop, collect discharged in an air tank, and supply the air tank as a compressed air source in a predetermined pressure range.

2. The compressor operation control system according to claim 1,
wherein the combination of the controller setting values includes a pressure target value, and setting values related to the pressure of an upper limit, and a lower limit, and after the pressure exceeds the setting value for pressure, the combination includes a setting value related a time until the compressor executes starting, loading, unloading, or stopping.

3. The compressor operation control system according to claim 2,
wherein the controller model in the simulator calculates a time change rate of the pressure, predicts the pressure which has changed for a certain period of time $\Delta T$ at the time change rate, and upon determining that the predicted pressure exceeds the lower limit or the upper limit, the controller model outputs a signal to start or stop the compressor, and wherein the combination of the controller setting values includes the certain period of time $\Delta T$, and also includes a unit time $\Delta t$ for calculating the time change rate of the pressure.

4. The compressor operation control system according to claim 1,
wherein the CPU is programmed to output a table including the combination of the plurality of controller setting values, a minimum value of the supply pressure obtained from the calculation result output by the simulator for the combination of the controller setting values, and the number of compressor starts/stops.

5. The compressor operation control system controller according to claim 1,
wherein the CPU is programmed to output a graph centered on a minimum value of the supply pressure obtained from the calculation result output by the simulator and the number of compressor starts/stops.

6. The compressor operation control system according to claim 5,
wherein the graph displays the lower limit of the supply pressure and the upper limit of the number of compressor starts/stops.

7. The compressor operation control system according to claim 1,
wherein the CPU is coupled to an external network, and
wherein CPU is programmed to exchange data with the external network, the device being capable of inputting and outputting.

8. A method for a compressor operation control system, the system including a plurality of compressors, a compressor operation controller for starting or stopping one or more of the compressors, collecting discharged air of the compressors in an air tank, and supplying the air tank as a compressed air source in a predetermined pressure range, and a central processing unit (CPU), the method comprising the steps of:
receiving piping network information which is an element of a pressure loss of a piping flow from the compressor to a pressure control position of the controller, compressor specifications which are an upper limit of a discharge pressure of the compressor and a number of starts/stops, a supply flow rate condition which is time change data of a flow rate flowing from the pressure control position of the controller, and a supply pressure condition which is a lower limit of the supply pressure at the pressure control position of the controller;
generating, based on a predetermined rule, a combination of the controller setting values and providing the generated combination to a simulator;
calculating, by the simulator, time-series data of the supply pressure and time series data of am operating state of the compressor by combining a piping network model that simulates the pressure and flow rate of the piping network and a controller model that simulates a signal of the controller;
calculating a predicted value of the supply pressure and a number of compressor starts/stops according to calculation results output by the simulator;
outputting, to the compressor operation controller, a combination of a plurality of the controller setting values, a predicted value of the supply pressure for the combination of the controller setting values, and the number of compressor starts/stops; and
controlling one or more of the compressors, by the compressor operation controller, to start or stop, collect discharged in an air tank, and supply the air tank as a compressed air source in a predetermined pressure range.

9. The method for assigning compressor controller settings values according to claim 8,
wherein the combination of the controller setting values includes a pressure target value, and setting values related to the pressure of an upper limit, and a lower limit, and after the pressure exceeds the setting value for pressure, the combination includes a setting value related a time until the compressor executes starting, loading, unloading, or stopping.

10. The method for assigning compressor controller settings values according to claim 9,
wherein the controller model in the simulator calculates a time change rate of the pressure, predicts the pressure which has changed for a certain period of time $\Delta T$ at the time change rate, and upon determining that the predicted pressure exceeds the lower limit or the upper limit, the controller model outputs a signal to start or stop the compressor, and
wherein the combination of the controller setting values includes the certain period of time $\Delta T$, and also includes a unit time $\Delta t$ for calculating the time change rate of the pressure.

11. The method for assigning compressor controller settings values according to claim 8,
wherein the outputting includes outputting a table including the combination of the plurality of controller setting values, a minimum value of the supply pressure obtained from the calculation result output by the simulator for the combination of the controller setting values, and the number of compressor starts/stops.

12. The method for assigning compressor controller settings values according to claim 8,
wherein the outputting includes outputting a graph centered on a minimum value of the supply pressure obtained from the calculation result output by the simulator and the number of compressor starts/stops.

* * * * *